United States Patent
Tiwari et al.

(10) Patent No.: US 9,825,818 B2
(45) Date of Patent: Nov. 21, 2017

(54) DEVICE HIERARCHY BUILDING FOR A REMOTE TERMINAL UNIT

(71) Applicant: BRISTOL, INC., Watertown, CT (US)

(72) Inventors: Neeraj D. Tiwari, Pune (IN); Richard J. Vanderah, Marshalltown, IA (US)

(73) Assignee: BRISTOL, INC., Watertown, CT (US)

( * ) Notice: Subject to any disclaimer, the term of this patent is extended or adjusted under 35 U.S.C. 154(b) by 89 days.

(21) Appl. No.: 14/874,261

(22) Filed: Oct. 2, 2015

(65) Prior Publication Data

US 2016/0099841 A1 Apr. 7, 2016

(30) Foreign Application Priority Data

Oct. 4, 2014 (IN) .......................... 3149/MUM/2014

(51) Int. Cl.
*G05B 19/418* (2006.01)
*H04L 12/24* (2006.01)
*H04W 76/02* (2009.01)

(52) U.S. Cl.
CPC .......... *H04L 41/12* (2013.01); *G05B 19/4185* (2013.01); *H04L 41/0806* (2013.01); *H04W 76/021* (2013.01); *G05B 2219/33342* (2013.01); *Y02P 90/18* (2015.11)

(58) Field of Classification Search
CPC ..................... Y02P 90/02; Y02P 90/10; G05B 2219/32015; G05B 2219/25428
USPC ................................................. 702/188, 183
See application file for complete search history.

(56) References Cited

U.S. PATENT DOCUMENTS

| | | | | |
|---|---|---|---|---|
| 6,449,715 | B1 * | 9/2002 | Krivoshein | G05B 19/4185 700/1 |
| 8,144,028 | B2 * | 3/2012 | LaMothe | G05B 23/0221 340/870.07 |
| 2005/0033466 | A1 * | 2/2005 | Eryurek | G05B 13/0275 700/108 |
| 2005/0197805 | A1 * | 9/2005 | Eryurek | G05B 23/0272 702/188 |
| 2005/0197806 | A1 | 9/2005 | Eryurek et al. | |
| 2016/0098037 | A1 * | 4/2016 | Zornio | G05B 19/41855 700/20 |

FOREIGN PATENT DOCUMENTS

GB 2394630 A 4/2004

OTHER PUBLICATIONS

International Search Report and Written Opinion for Application No. PCT/US2015/053779 dated Jan. 19, 2015.

* cited by examiner

*Primary Examiner* — Charles C Jiang
*Assistant Examiner* — Will Lin
(74) *Attorney, Agent, or Firm* — Marshall, Gerstein & Borun LLP

(57) ABSTRACT

A system constructs a hierarchy for field devices communicatively coupled to a remote terminal unit (RTU) by retrieving device information from field devices, caching the device information in the memory of the RTU, storing device identities in the memory of a host machine, and obtaining the device information at the host from the RTU in response to subsequent user requests to build the hierarchy, without re-sending commands to retrieve the device information directly to the field devices.

20 Claims, 5 Drawing Sheets

DEVICE HIERARCHY BUILDING FOR A REMOTE TERMINAL UNIT

FIELD OF THE TECHNOLOGY

The present invention relates generally to process plant systems and, more particularly, to configuring server actions in process control and data acquisition systems.

BACKGROUND INFORMATION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as field devices conforming to the well-known Fieldbus protocol may also perform control calculations, alarming functions, and other control functions commonly implemented within the controller. The process controllers, which are also typically located within the plant environment, receive signals indicative of process measurements made by sensors and/or field devices and/or other information pertaining to the field devices and execute a controller application that runs, for example, different control modules that make process control decisions, generate control signals based on the received information and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

A distributed process control system can include one or more remote terminal units (RTUs), which can be implemented flow computers coupled to field devices. Accordingly, RTUs sometimes are referred to as "flow computers" or simply "controllers." An RTU can include, for example, an I/O module for connecting to wired Highway Addressable Remote Transducer (HART) field devices and an I/O module for connecting to wireless HART field device. A machine host that implements a supervisory control and data acquisition system, such as an asset management system (AMS), can communicate with one or more RTUs to collect information regarding field devices connected to the RTUs. In some cases, a HART server, which can be implemented in a separate dedicated host, provides an interface to HART field devices. The AMS and the HART server can operate according to a Remote Access Service (RAS) scheme. For example, the AMS can interact with network interface for RAS using RAS Host System Interface (HSI). The AMS can connect with the RAS HART server via multiple Ethernet ports, to pass different types of data and/or commands.

One of the purposes for which an AMS can collect information about field devices from an RTU is constructing a complete hierarchy of field devices, including determining device identities, parent-child relationships, etc. The AMS can then generate a visualization and/or a text description of the hierarchy for the operator of the host machine. For devices that communicate using the HART protocol ("HART devices"), the AMS can request device hierarchy information via a HART server, which generally sends a sequence of HART commands to each device to collect the necessary information. More particularly, the sequence can include command #0 to retrieve device identity, command #13 to retrieve the so-called short tag, specifies describes certain parameters of the device, and, for some devices, command #20 to retrieve the so-called long tag, which describes additional parameters of the device. The step of collecting this information can take eight to 12 second per HART device to collect the necessary information. For wireless HART devices operating in a large mesh network, this step can take even longer.

As a result, building the entire device hierarchy for an RTU is a time-consuming operation, and the duration depends to a large extent on the number of connected HART devices.

SUMMARY

An hierarchy builder operating in a host machine constructs an hierarchy of field devices coupled to a remote terminal unit (RTU), which in turn is coupled to the host machine, without directly querying the field devices. The RTU can store information about the field devices in a local memory, while the host machine can store only identities of the field devices. When an operator of the host machine requests an updated description of the hierarchy, the host machine transmits a request for device information to the RTU, with the request including the identities of field devices. In response, the RTU retrieves the information from the local memory and provides the retrieved information to the hierarchy builder. In this manner, the hierarchy builder can retrieve the information required for constructing device hierarchy quickly and efficiently.

The field devices can conform to the HART protocol, and the device identity stored at the host can correspond to the response to HART command #0 (or a suitable portion thereof). The RTU can store responses to HART commands for retrieving device tags, such as commands #13 and #20, as well as current device status. The RTU can implement a HART hierarchy reporting module that caches HART responses, reports device information to the host, processes pass-through commands, etc. The hierarchy builder operating in the host machine and the HART hierarchy reporting module can operate as components of a hierarchy generation engine. Further, to eliminate redundancy, the host can store only one device tag for every HART device, rather than storing a short device tag and a long device tag. More specifically, the RTU can store only the short device tag for every wired HART field device and only the long device tag for every wireless HART field device when available (otherwise, the RTU can store the short device tag for the wireless HART field device), and the host can store the same tag available in the memory of the RTU.

DETAILED DESCRIPTION

Overview

Figure 1:
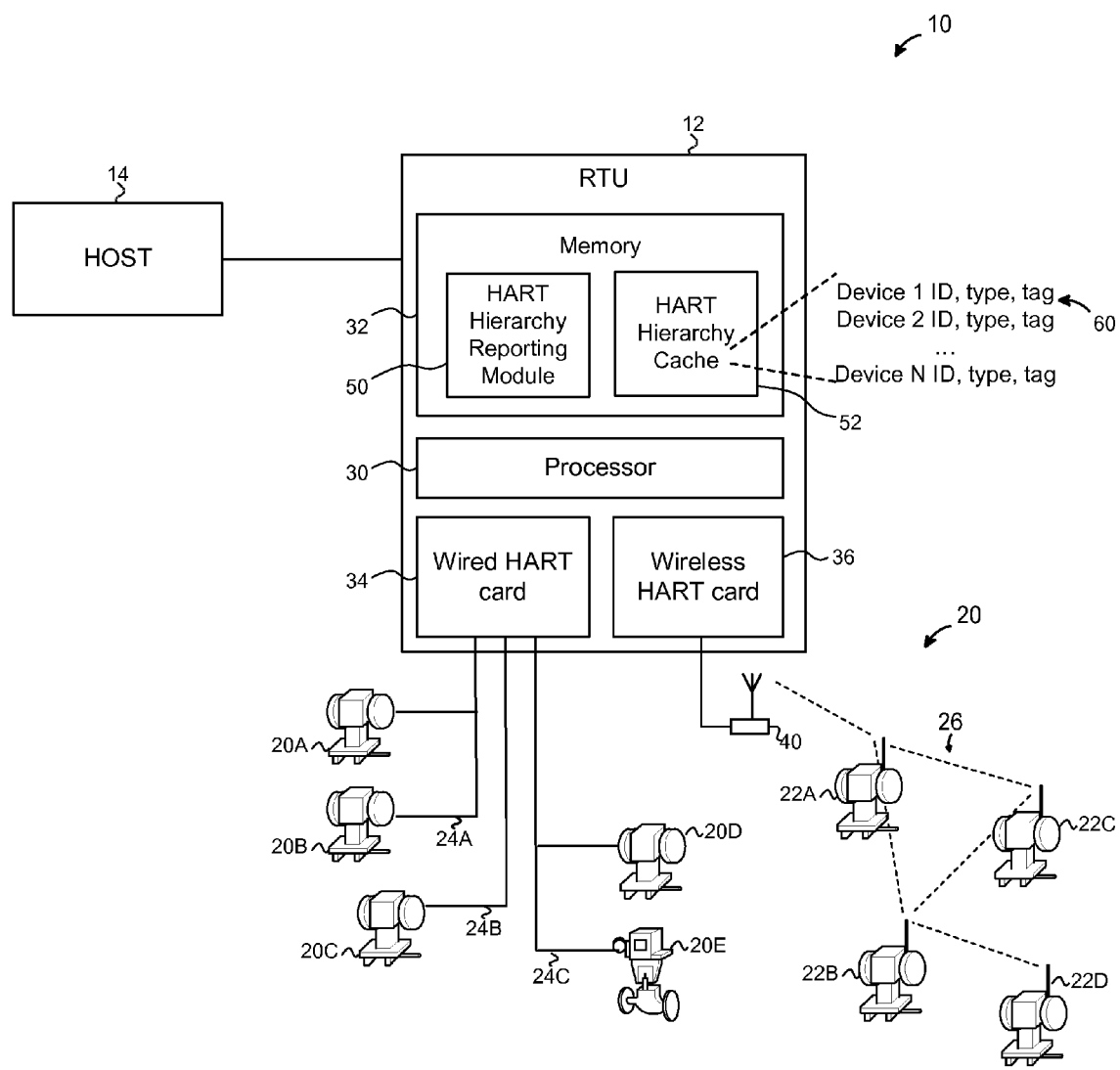
FIG. 1 is a block diagram of a portion of an example process plant or process control system in which an RTU caches device information to allow a host machine to construct a field device hierarchy using the techniques of this disclosure.

Generally speaking, an hierarchy generation engine of this disclosure quickly and efficiently generates a hierarchy for field devices connected to an RTU. An example hierarchy generation engine can include a hierarchy builder operating in a host machine and a HART Hierarchy Reporting Module operating in an RTU. In the first instance, the RTU sends HART commands to field devices to determine respective device identities, device tags, and retrieve device tags. The RTU stores this information in a database, which can operate as a quickly accessible cache. The stored information can include device tags. According to one example implementation, the RTU stores only tag per HART device. The RTU can also forward the retrieved information to the host machine.

The hierarchy builder can store the device identification information (or simply "device identity") in the memory of the host machine. As a more specific example, the hierarchy builder can store responses to HART command #0 in a persistent memory, such as a hard disk. When the operator of the host machine wishes to rebuild or "refresh" hierarchy information, the hierarchy builder sends a request for device information to the RTU. In response, the RTU retrieves the device information from the memory of the RTU, without re-sending HART commands to the field devices. The RTU then forwards the device information to the host machine. In an example implementation, the RTU forwards device status and communication status for each HART device currently connected to the RTU.

Once the hierarchy builder operating in the host machine receives the information necessary for building an updated hierarchy from the RTU, the hierarchy builder generates a textual or visual representation of the hierarchy. The host machine thus rebuilds the hierarchy in this instance without directly querying the field devices. When multiple RTUs are accessible to the host machine, the operator can thus request that the hierarchy be rebuilt for a particular RTU, several RTUs, or all the accessible RTUs. Thus, the hierarchy builder can build a complete hierarchy or a only a desired portion of the hierarchy using the information cached at an RTU. Moreover, the hierarchy builder can rebuild a specific portion of an hierarchy and use previously built one or more portions of the hierarchy without any changes.

For clarity, the techniques for constructing device hierarchy are discussed below primarily with reference to HART devices. However, it will be understood that similar techniques can be applied to other types of field devices and industrial automation protocols (e.g., Fieldbus, Profibus), particularly to those protocols that require exchanging messages to obtain device information. Moreover, these techniques in general can be used in systems where a host collects data from remote devices using an intermediate broker device or "agent," particularly large systems that include many devices. In other words, an RTU is only one example of an intermediate broker device, and the host machine is only one example of a central unit, that can be used with the techniques of this disclosure. Similarly, HART field devices are only one example of remote units to which the techniques of this disclosure apply.

Example System and Devices

FIG. 1 is a block diagram of an example system 10 in which an RTU 12 operates to retrieve, store, and report information related to field devices 20 to a host 14. The field devices 20 can include wired HART devices 20A-20E and/or wireless HART devices 22A-22D. The wired field devices 20A-20E can communicate via wired links 24A-24C. The wireless HART devices 22A-22D operate in a wireless mesh network 26 via multiple communication links between pairs of devices. The field devices 20 may be any types of devices, such valves, valve positioners, switches, sensors (e.g., temperature, pressure, vibration, flow rate, or pH sensors), pumps, fans, etc. The field devices 20 perform control, monitoring, and/or physical functions within a process or process control loops, such as opening or closing valves or taking measurements of process parameters, for example. In addition to the field devices 20, the RTU 12 can be coupled to other remote units such as adapters or gateways to other networks, for example.

The RTU 12 can include a processor 30, which can include any suitable general-purpose or embedded processing unit, a memory 32, which can include any suitable persistent and/or non-persistent storage components readable by the processor 30, a wired HART card 34, and a wireless card HART card 36. Each of the cards 34 and 36 can be configured to transmit and receive messages that conform to the HART communication protocol. The RTU 12 can access the wired field devices 20A-20E via the card 34, and wireless field devices 22A-22D via the card 36 and, in at least some of the embodiments, a wireless access point 40

For simplicity, FIG. 1 illustrates only one host machine, one RTU, and field devices coupled to the RTU via one wired card and one wireless card. In general, however, the system 10 can include additional devices, communication links, and communication networks. For example, the system 10 in some implementations can include access points, gateways to other process plants (e.g., via an intranet or corporate wide area network), gateways to external systems (e.g., to the Internet), human interface (HMI) devices, servers, data systems (e.g., including process databases, historians, etc.), controllers, input/output (I/O) cards operating in controllers, routers, additional wired communication networks, additional wireless communication networks, etc.

The memory 32 can store software and/or firmware instructions, executable on the processor 30, that implement a HART hierarchy reporting module 50. In operation, the module 50 formats and transmit HART commands to the field devices 20, receives responses to the HART commands from the field devices 20, and transmits pass-through commands between the host 14 and the field devices 20. Example HART commands which the module 50 can transmit and receive and discussed in more detail with reference to FIG. 4. It is noted again that HART devices and HART commands are only one example of a standard for communicating process control information with which the techniques of this disclosure can be used.

The module 50 can store the information about the wired and/or wireless field devices 20 in HART hierarchy cache 52, which can be any suitable portion of the memory 32. The cache 52 can be implemented as one or several tables of a relational database or using any other suitable data structures. In an example implementation, the cache 52 stores, for each of the field devices 20, a respective record 60 including device identity, device type, and a device tag. The device identity can be a response to command #0. As is known, HART devices can report 8-character, "short" tags, and some (rev 7) HART devices can report 32-character, "long" tags. Further, the cache 52 can store the current state of the field device as "seen" by the RTU 12. The state can be, for example, "live" or "offline." In some embodiments, the module 50 stores in the cache 52, and reports to the host 14, a single tag for each of the field devices 20, even when both tags are available at some of the field devices 20.

In addition to collecting device information in response to a command from the host 14, the module 50 or another component operating in the RTU 12 can keep the cache 52 up-to-date with the current information from the devices 20. In general, the RTU 12 can receive status updates initiated by the field devices 20, or periodically poll the field devices 20 for updated information, for example.

Figure 2:
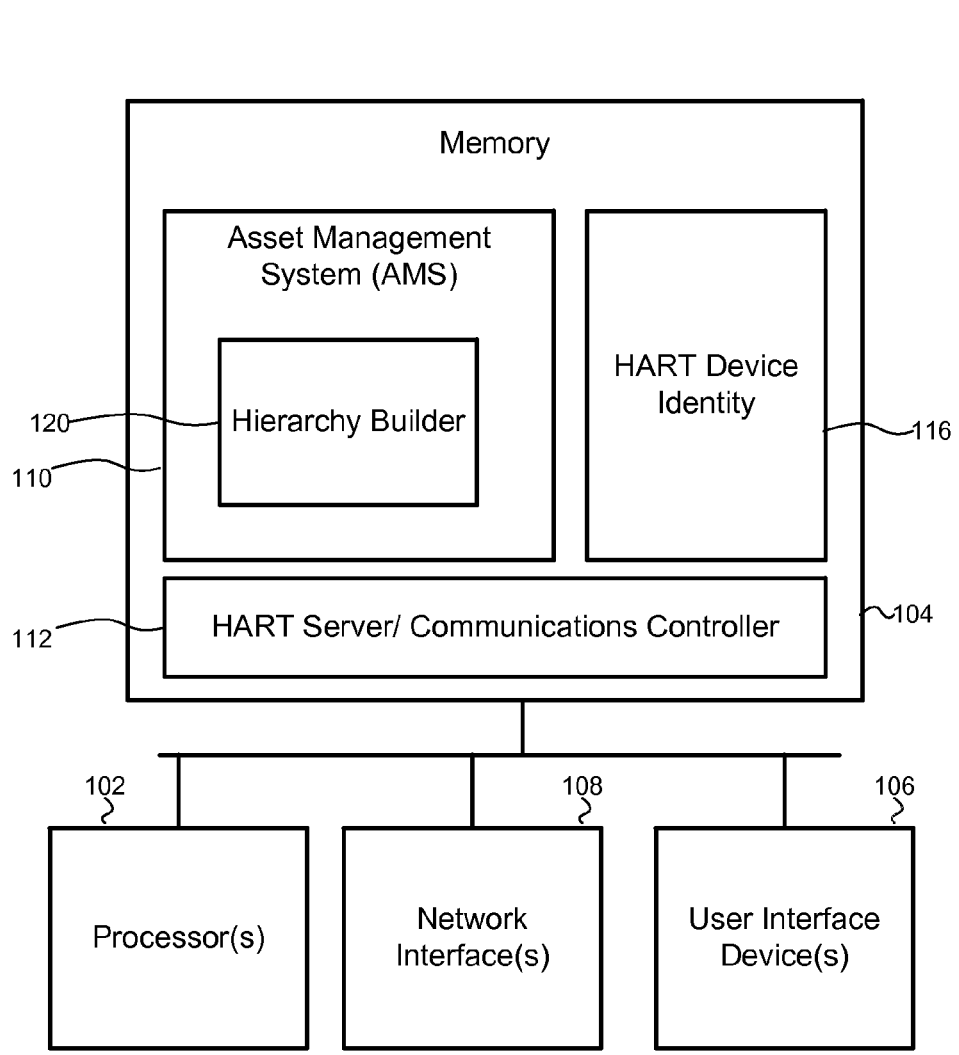
FIG. 2 is a block diagram of an example host that can operate in the system of FIG. 1.

In one embodiment, the host 14 is implemented as illustrated in FIG. 2. A host 100 includes one or more processors 102 coupled to a memory 104. The one or more processors 102 can be, for example, general-purpose Central Processing Units (CPUs). The memory 104 can be any suitable storage medium readable by the one or more processors 102, and can include persistent and/or non-persistent components. The host 100 also can include a user interface 106 including any suitable combination of one or more displays, touchscreens, keyboards, speakers, microphones, etc. An operator, such as a design engineer, an instrumentation engineer, a technician, etc. can operate the user interface 106 to specify commands and receive output from the host 100. Further, the host 100 can include one or more network interfaces 108 via which the host 100 can access remote devices including RTUs. The one or more network interfaces 108 can support suitable wired and/or wireless communications.

The memory 104 can store instructions executable on the one or more processors 102 as well as data on which these instructions operate. In particular, the memory 104 can store instructions of an Asset Management System (AMS) 110 that provides information to the operator regarding field devices operating in the process plant and, more generally, information regarding the process control plant in which the field devices operate. In some embodiments, the AMS 110 can operate as only one component of a distributed software system that monitors and controls various aspects of operating the process control plant. The memory 104 further can store a HART communication controller 112 configured to generate and receive commands that conform to the HART communication protocol. Still further, the memory 104 can store a HART device identity data 116, which can be implemented as a table of device identities reported by an RTU.

The device identity data 116 in some implementations includes responses to HART command #0. For example, in one embodiment, the host 100 stores the complete response to HART command #0 as the device identity. The device identity can include the expanded device type code, revision levels, and the device identification number. In another embodiment, the host 100 stores only the device identification number as the device identity. More generally, in these embodiments, the device identity data 116 can include the entirety or any suitable portion of the response to HART command #0. In some implementations, the device identity data 116 is statistic persistent data that does not change during the lifetime of the corresponding HART device.

The AMS 110 can include an hierarchy builder 120. In operation, the hierarchy builder 120 receives device identities from remote devices such as RTUs, stores the device identities in the memory 104 as part of the HART device identity data 116, and uses the stored device identities to efficiently request and receive updated HART device information from the remote devices. When the hierarchy builder 120 receives information regarding the HART devices coupled to a certain RTU, including the describes parent-child relationships between the HART devices, the hierarchy builder 120 can generate a textual and/or visual representation of the device hierarchy.

Figure 3:
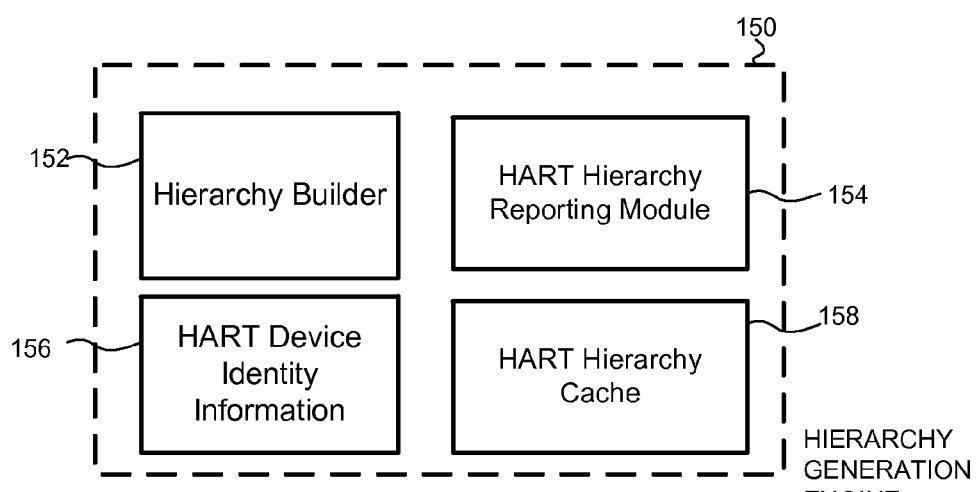
FIG. 3 is a block diagram of an example hierarchy generation engine that can operate in the system of FIG. 1.

For further clarity, FIG. 3 illustrates an example hierarchy generation engine 150 that can include some or all of the components for generating field device hierarchy discussed above. The hierarchy generation engine 150 in this implementation includes an hierarchy builder 152, a HART hierarchy reporting module 154, HART device identity information 156, and a HART hierarchy cache 158. According to some embodiments, the hierarchy builder 152 operates in a host machine, and the HART hierarchy reporting module 154 operates in an RTU or another suitable device communicatively coupled to field devices. More generally, however, the modules 152 and 154 can be distributed among two or more machines in any suitable manner. Each of the modules 152 and 154 can be implemented using software, firmware, hardware, or any suitable combination thereof. The modules 152 and 154 can utilize data 156 and 158, respectively, each of which can be stored in one or several memory modules, and organized using any suitable data structures.

Example Device Hierarchy

Figure 4:
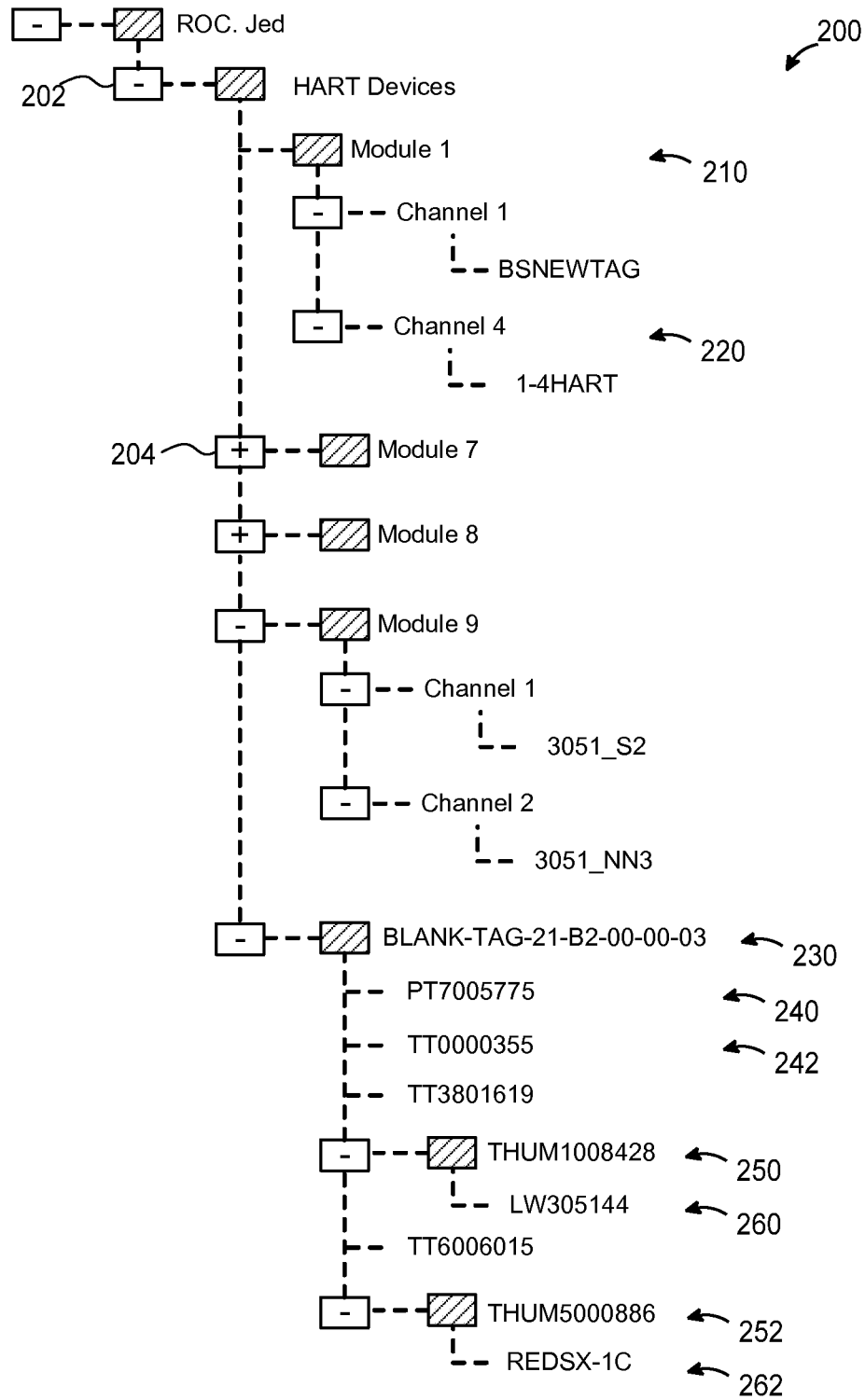
FIG. 4 schematically illustrates an example device hierarchy which the hierarchy generation engine of FIG. 3 can construct.

Next, FIG. 4 schematically illustrates an example hierarchy 200 which the hierarchy builder 120 or 152 can construct. As indicated above, the hierarchy builder 120 or 152 can also generate any suitable visualization or textual description of the hierarchy 200. For example, the hierarchy builder 120 or 152 can include a graphic at each node of the hierarchy to illustrate the corresponding type of device or communication channel. In FIG. 4, indicators of type 202 correspond to already-expanded branches, and indicators of type 204 correspond to branches that can be expanded to illustrate further nodes and/or sub-branches.

Generally speaking, device hierarchy describes organization of HART devices in an RTU network. A typical device hierarchy describes network topology and the following information: (i) RTU name and type, (ii) HART card/module, and (iii) wired channels. For wireless HART, the hierarchy may not specify a channel, and may consider all wireless HART devices to reside on the same channel. For a HART device on a certain channel, the information includes a device tag, a device host-path, and the response to HART command #0. In some embodiments, however, a portion of the response to HART command #0 can be omitted.

The hierarchy 200 illustrates HART devices under module nodes (e.g., node 210) and under channel modes (e.g., node 220). The components of a node include a device tag and device identify information. As discussed in more detail below, a HART device can include a short tag and, in some cases, a long tag. The device identify information can be a response to HART command #0. For wireless HART devices, the hierarchy 200 includes a HART server node (e.g., 230) at the top and wireless HART device nodes (e.g., nodes 240 and 242) along with Wireless HART adapter nodes (e.g., nodes 250 and 252) at a level below. Wired device connected to a Wireless HART adapters can be represented in the hierarchy 200 as sub-device nodes (e.g., nodes 260 and 262). In general, the hierarchy 200 can correspond to a single RTU or several RTUs, and can include any number of nodes representing sensors, actuators, positioners, other devices that generate measurements or perform physical functions in a process plant, as well as servers, adapters, routers, communication channels, etc.

Generating Device Hierarchy

Figure 5:
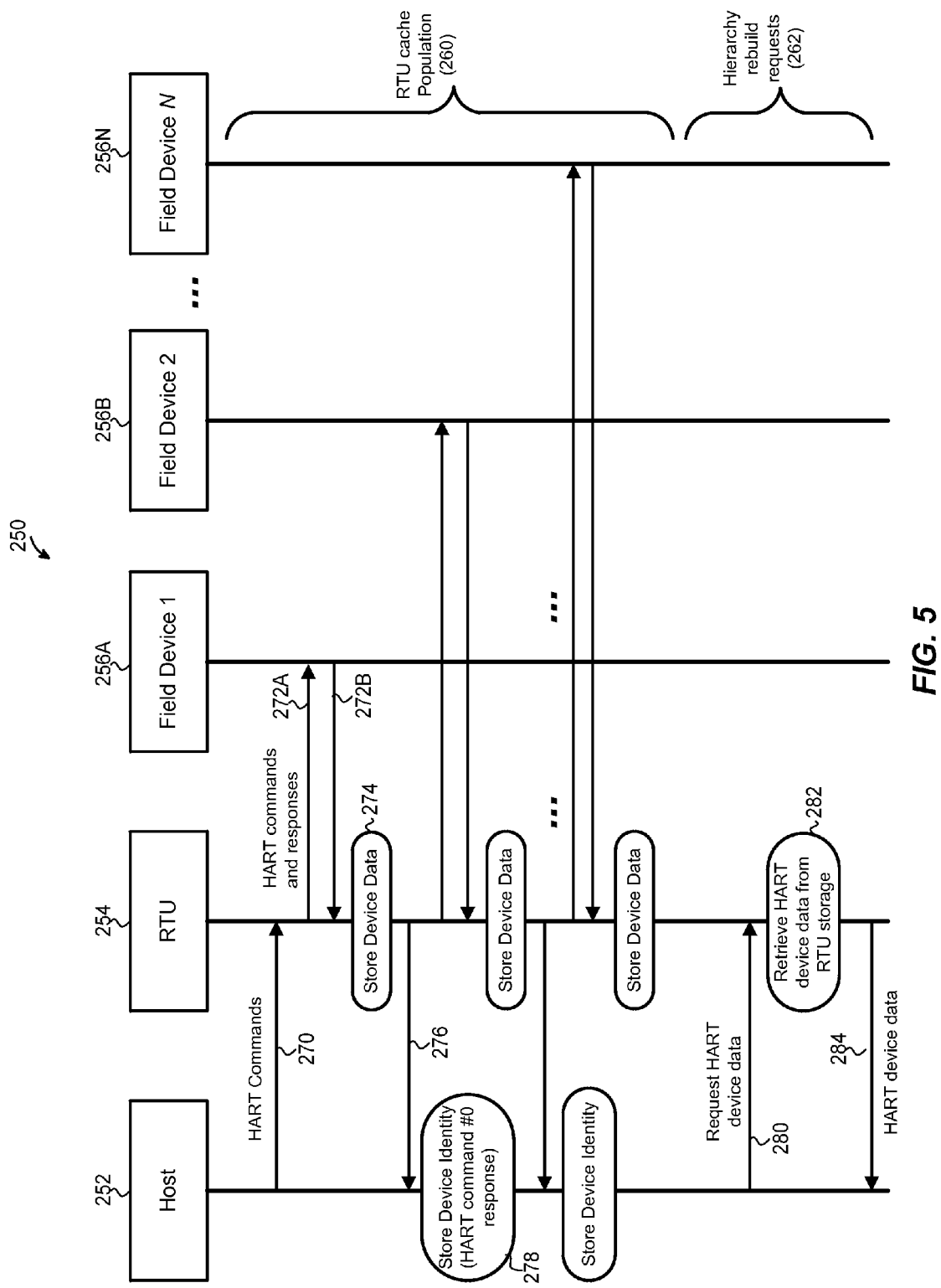
FIG. 5 is an example messaging diagram that illustrates flow of information between a host, an RTU, and several field devices, to construct a device hierarchy according to the techniques of this disclosure.

Now referring to FIG. 5, a messaging diagram 250 illustrates example flow of information between a host 252, an RTU 254, and several field devices 256A, 256B, . . . 256N, collectively referred to as "field devices 256." The host 252 can be similar to the host 14 and/or host 100, the RTU 254 can be similar to the RTU 12, and the field devices 256 can be similar to the field devices 20, discussed above with reference to FIGS. 1 and 2. In FIG. 5, arrows represent flow of information in the indicated direction via wired or wireless communication channels. Each arrow can correspond to a single command or message or, in some cases, a sequence of commands or messages.

During a cache population stage 260, the host 252 or the RTU 254 generates a sequence of commands to collect information from the field devices 256. During subsequent rebuild stages 262, the host 252 queries the RTU 254 for similar information, and the RTU 254 retrieves the information from a memory local to the RTU 256, without querying the field devices 256 again. In the illustrated embodiment, the host 252 sends pass-through HART commands to the RTU, but in another embodiment the host 252 can send a message that conforms to another, non-HART communication protocol to the RTU 254, and in response the RTU 254 can format and transmit HART commands to the field devices 256. It is noted again that HART is only example of a communication protocol for exchanging process control information between field devices, controllers, host machines, etc., and that in other embodiments the devices 252, 254, and 256 can use other suitable protocols.

As illustrated in FIG. 5, the host 252 can transmit one or several HART commands 270 to the RTU 254 for the field device 256A, at the stage 260. The HART commands 270 can be specific to individual field devices, or a single HART command can be sent to request data for multiple field devices. Prior to the host 252 generating the commands 270, the host 252 may have detected that the RTU 254 has been added, and sent a request to the RTU 254, asking the RTU 254 to identify wired and wireless HART cards with which the RTU 254 is equipped. The RTU 254 may have provided the information necessary for the host 252 to generate the commands 270.

The commands 270 can include (i) command #0, which requests that the field device report its unique identity, (ii) command #13 to read the short tag from the field device, and (iii) command #20 to read the long tag from the field device, when one is available. The RTU 254 can pass (forward) the commands 270 to the field device 256A as commands 272A, and receive responses 272B.

The RTU 254 can store the received responses in a cache (event 274). In particular, the RTU 254 can store device identity, device type, and device tag data in a database, which can be implemented using any suitable data structure in a locally accessible memory. If the RTU 254 is implemented similar to the RTU 12 illustrated in FIG. 1, the HART hierarchy reporting module 50 can store this information in the HART hierarchy cache 52. The RTU 254 then can forward the requested information to the host 252 as message 276. The host 252 in turn can store device identity in a local memory (event 278). The device identity can include the entire response to HART command #0, or a certain portion of the response.

The host 252 and the RTU 254 can exchange similar messages for field devices 256B, . . . 256N, as schematically illustrated in FIG. 5. In short, during the stage 260, the RTU 254 collects and caches responses to HART commands from the field devices 256A, 256B, . . . 256N, and the host 252 caches identities of the devices. It is noted, however, that the RTU 254 in some cases also collects data from the field devices 256A, 256B, . . . 256N in response to a periodic request from the RTU 254 or otherwise in response to events other than requests from the host 252. In these cases, the RTU 254 can cache data from the field devices 256A, 256B, . . . 256N without also forwarding this data to the host 252. Further, the some implementations, the RTU 254 can selectively cache responses to the HART commands 270 or commands originated at the RTU 254, based on the command type. For example, the RTU in one embodiment caches responses to command #0 so as to respond to the next command #0 from the host 252 using cached data, without the slower data exchange with the corresponding field device. Still further, in some implementations, the RTU 254 can treat all of the HART commands 270 from the host 252 as pass-through messages and not cache, or otherwise process, responses to these pass-through messages. In these implementations, the RTU 254 caches only the data the field devices 256A, 256B, . . . 256N provide in response to commands originated at the RTU 254.

At a time subsequent to the events 274 and 278, the host 252 can query the RTU 254 regarding the HART devices to which the RTU 254 is coupled (message 280). Rather than transmitting multiple HART commands to each of the field devices 2256A, 256B, . . . 256N, the RTU 254 can look up device information in the local memory (event 282) and respond to the query from the host 252 (message 284). More specifically, the host 252 can send a device identity to the RTU 254, which the RTU 254 can use to look up device information. If the RTU 254 cannot find information for the specified device, the RTU 254 can send command #0 via the corresponding wired or wireless HART card (in some embodiments, however, the host 252 relies only on the cache local to the host 252 to rebuild the device hierarchy). Also, the RTU 254 in some cases can store timestamps for the responses received from the field devices 256A, 256B, . . . 256N and, in response to a request from the host 252, provide cached data to the host 252 only when the cached data is not old, i.e., within a certain specified time interval relative to the time of the request. The RTU 254 alternatively can report the timestamps to the host 252 as part of the message(s) 284, or use the timestamps to dynamically determine whether to send a HART command to the field device to get a fresh response and respond to the host 252 with the fresh response, or use the cached data to immediately respond to the host 252.

Figure 6:
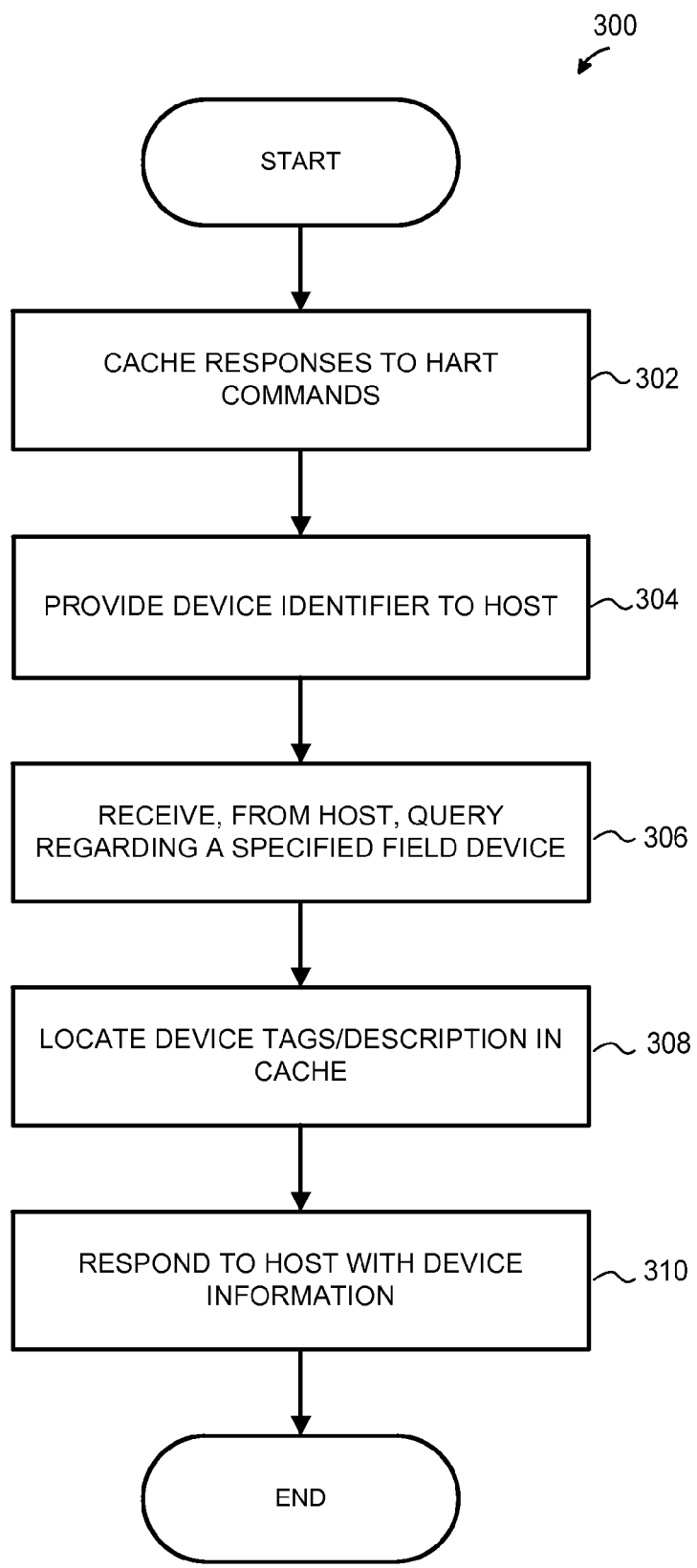
FIG. 6 is a flow diagram of an example method for managing device information using cache, which can be implemented in the RTU of FIG. 1.

FIG. 6 is a flow diagram of an example method 300 for caching device information, which can be implemented in an RTU, such as the RTU 12 or 254 discussed above. The method can be implemented in software, firmware, hardware, or any suitable combination thereof.

The method 302 begins at block 300, where responses to HART commands are received and cached. As discussed above, for a certain field device an RTU can store the device tag and the current status of the device. The RTU also can store, or index a table with, the same identity of the device which the RTU provides to the host (block 304, which can be executed once per lifetime of a field device, in some implementations). In this manner, the host can unambiguously reference field devices for which RTU caches information.

Next, at block 306, a request for information regarding a certain field device coupled to the RTU is received. The request can include the device identity. At block 308, information regarding the field device is located in a local cache using the device identity, and provided to the host at block 310. As discussed above, if information for the field cannot be found in the local memory, one or several HART commands can be transmitted to query the field device. For example, HART command #0 can be transmitted.

Further Alternatives

Referring generally to the discussion above, some of the alternatives can include excluding HART command #0 response from the initial hierarchy build. In other words, the RTU can omit forwarding the response to command #0 to speed the process of building the hierarchy at the host, and supply this information as part of a background task or at a later time.

Further, according to one implementation, a host displays the initial hierarchy based on historical data. The host then launches a background task for collecting updated HART device information, via one or several RTUs. In this manner, the host quickly display the hierarchy using device information cached at the RTU and/or at the host, and update the information according to the new network configuration.

Still further, in one implementation, the RTU can cache HART command #0 responses for all HART devices connected to the RTU. When the RTU receives a pass-through HART message from the host, the RTU can respond to the pass-through HART commands using cached data, without transmitting the pass-through message to the HART field device. It is noted that in this embodiment, the host need not be aware of whether the RTU responds using cached data or is in fact retransmitting pass-through HART commands. In other words, the host need not be specifically configured to support the caching technique at the RTU.

General Remarks

From the foregoing, it will be understood that the techniques of this disclosure reduce the dependency of a host device on external data available at field devices, and efficiently uses already-available, local information. In the specific examples discussed above, the RTU keeps up-to-date information for field devices, and makes it unnecessary in certain situations for the host and field devices to exchange HART commands/messages, using the RTU as a pass-through device.

Further, in those situations where retrieving static information from a remote unit takes a relatively long time, and where the information is likely to be requested in the future, the techniques of this disclosure allow devices to store the static information in a locally accessible memory, rather than request the same information again from the remote unit. More specifically, in the example embodiments and scenarios discussed above, when the user rebuilds device hierarchy or re-connects to an RTU that still has the same HART devices, the RTU can quickly retrieve the response to HART command #0 from a memory locally accessible to the RTU, and provide the response to the host.

Still further, the techniques of this disclosure reduce data redundancy. As discussed above, the RTU can store a single tag for every HART device, and the host can store the same single tag, which is sufficient for generating a hierarchy at a host.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, engines, routines, and modules described herein may be stored in any tangible, non-transitory computer readable memory such as on a magnetic disk, a laser disk, solid state memory device, molecular memory storage device, an optical disk, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A system for building a device hierarchy for a process plant, the system comprising:
a central unit including one or more processors and a local memory;

a broker agent communicatively coupled to the central unit and including a cache; and a plurality of remote units communicatively coupled to the broker agent, the plurality of remote units including a plurality of field devices at least some of which perform one or more physical functions to control a process executing in a process plant, the system configured to:
  obtain, at the broker agent, device identification information for the plurality of remote units using commands transmitted between the broker agent and the plurality of remote units;
  store, in the cache of the broker agent, the obtained device identification information for the plurality of remote units;
  subsequently to storing the device identification information in the cache, provide the device identification information for the plurality of remote units stored in the cache of the broker agent to the central unit;
  store, at the local memory of the central unit, a respective device identification information;
  build, at the central unit, at least a portion of a device hierarchy for the plurality of remote units and the broker agent using the respective device identification information, the device hierarchy indicating respective parent-child relationships between one or more pairs of remote units included in the plurality of remote units; and
  enable the at least the portion of the device hierarchy to be accessible via the central unit.

2. The system of claim 1, wherein the respective device identification information includes at least one of a respective device type, a respective device identity, or a respective device tag of a field device included in the plurality of remote units.

3. The system of claim 2, wherein the respective device identification information includes the respective device tag of the field device, and wherein the local memory stores only one device tag of the field device, the one device tag being the respective device tag.

4. The system of claim 3, wherein the one device tag of the field device stored at the local memory is a longest device tag of a plurality of device tags of the field device.

5. The system of claim 2, wherein the field device is one of a wired field device or a wireless field device.

6. The system of claim 5, wherein the field device is one of a wired HART field device or a wireless HART field device.

7. The system of claim 1, wherein:
the at least the portion of the device hierarchy is at least a first portion of the device hierarchy, the respective device identification information is first device identification information, and the system is further configured to:
  store, at the local memory of the central unit, second device identification information included in one or more communications that were transmitted from the plurality of remote units after the building of the at least the first portion of the device hierarchy; and
  at least one of: (i) re-build the at least the first portion of the device hierarchy, or (ii) build at least a second portion of the device hierarchy using the stored second device identification information.

8. The system of claim 7, wherein the one or more communications that were transmitted from the plurality of remote units include a HART Command #0 message, and wherein the second device identification information includes transmitted response to the HART command #0 message.

9. The system of claim 1, wherein the one or more of the plurality of remote units is at least a first subset of the plurality of remote units, the at least the portion of the device hierarchy is at least a first portion of the device hierarchy, and the system is further configured to:
  obtain, from the broker agent after the building of the at least the first portion of the device hierarchy, at least one of a respective device status or a respective communication status of each remote unit included in at least a second subset of the plurality of remote units; and
  at least one of: i) re-build the at least the first portion of the device hierarchy, or (ii) build at least a second portion of the device hierarchy using the at least one of the respective device status or the respective communication status.

10. The system of claim 1, wherein the broker agent is included in a plurality of broker agents each of which is coupled to a respective plurality of remote units, and wherein the system is further configured to build broker agents.

11. The system of claim 1, further comprising a user interface to a display of the built at least the portion of the device hierarchy.

12. A method for building a device hierarchy for a process including a central unit communicatively coupled to a broker agent and a plurality of remote units communicatively coupled to the broker agent, the plurality of remote units including a plurality of field devices at least some of which perform one or more physical functions to control a process executing in a process plant, the method comprising:
  obtaining, at the broker agent, device identification information for the plurality of remote units using commands transmitted between the broker agent and the plurality of remote units;
  storing, in a cache of the broker agent, the obtained device identification information for the plurality of remote units;
  subsequently to storing the device identification information in the cache, providing the device identification information for the plurality of remote units stored in the cache of the broker agent to the central unit;
  storing, at a first memory accessible to the central unit, a respective device identification information;
  building, at the central unit, at least a portion of a device hierarchy for the plurality of remote units and the broker agent using the stored respective device identification information, the device hierarchy indicating respective parent-child relationships between one or more pairs of remote units included in the plurality of remote units; and
  storing, in at least one of the first memory or a second memory, the at least the portion of the device hierarchy for use by one or more other devices of the process plant.

13. The method of claim 12, wherein obtaining the respective device identification information of the plurality of remote units comprises obtaining at least one of a respective device type, a respective device identity, or a respective device tag of a field device included in the plurality of remote units.

14. The method of claim 12, wherein storing the obtained device identification information comprises storing only a single device tag of a field device included in the plurality of remote units.

15. The method of claim 12, wherein obtaining the respective device identification information of the plurality of remote units comprises obtaining respective device identification information of a wired field device or a wireless field device included in the plurality of remote units.

16. The method of claim 12, wherein the obtained device identification information is first obtained device identification information, and the method further comprises:
   after building the at least the portion of the device hierarchy using the first obtained device identification information, obtaining second device identification information included in one or more messages transmitted from the plurality of remote units;
   storing, in the first memory, the obtained second device identification information; and
   at least one of (i) re-building the at least the portion of the device hierarchy, or (ii) building at least another portion of the device hierarchy using the stored second device identification information.

17. The method of claim 12, wherein the one or more of the plurality of remote units is at least a first subset of the plurality of remote units, the at least the portion of the device hierarchy is at least a first portion of the device hierarchy, and the method further comprises:
   obtaining, from the broker agent, at least one of respective device status or respective communication status of each remote unit included in at least a second subset of the plurality of remote units; and
   at least one of: i) re-building the at least the first portion of the device hierarchy, or (ii) building at least a second portion of the device hierarchy using the at least one of the respective device status or the respective communication status.

18. The method of claim 12, wherein obtaining, at the broker agent, the device identification information for the plurality of remote units using commands transmitted between the broker agent and the plurality of remote units further includes:
   obtaining the device identification information for the plurality of remote units in response to one or more commands for the plurality of remote units generated by the central unit.

19. The method of claim 12, wherein providing the device identification information for the plurality of remote units stored in the cache of the broker agent to the central unit further includes:
   providing only the device identification information stored in the cache that is within a predetermined time interval relative to a time associated with storage of the obtained device identification information in the cache of the broker agent.

20. A system comprising:
   a central unit including one or more processors and a local memory;
   a broker agent communicatively coupled to the central unit and including a cache; and
   a plurality of remote units communicatively coupled to the broker agent, the plurality of remote units including a plurality of field devices at least some of which perform one or more physical functions to control a process executing in a process plant,
   the system configured to:
      obtain respective device identification information indicative of each of the plurality of remote units, the respective device identification information stored in the cache of the broker agent, wherein the respective device identification includes at least one of a respective device type, a respective device identity, or a respective device tag of a field device included in the plurality of remote units;
      store, at the local memory of the central unit, only a longest device tag of a plurality of device tags for each of a field device of the plurality of field devices;
      build at least a portion of a device hierarchy using the longest device tag for each of the field device of the plurality of field devices, the device hierarchy indicating respective parent-child relationships between one or more pairs of field devices included in the plurality of field devices; and
      enable the at least the portion of the device hierarchy to be accessible via the central unit.

* * * * *